(12) United States Patent
Asada et al.

(10) Patent No.: US 12,031,882 B2
(45) Date of Patent: Jul. 9, 2024

(54) METHODS AND SYSTEMS FOR TESTING ROBOTIC SYSTEMS IN AN INTEGRATED PHYSICAL AND SIMULATED ENVIRONMENT

(71) Applicant: Movensys Corporation, Lexington, MA (US)

(72) Inventors: Haruhiko Harry Asada, Lincoln, MA (US); Kota Weaver, Allston, MA (US)

(73) Assignee: Movensys Corporation, Lexington, MA (US)

( * ) Notice: Subject to any disclaimer, the term of this patent is extended or adjusted under 35 U.S.C. 154(b) by 472 days.

(21) Appl. No.: 16/914,217

(22) Filed: Jun. 26, 2020

(65) Prior Publication Data

US 2020/0408640 A1    Dec. 31, 2020

Related U.S. Application Data

(60) Provisional application No. 62/866,892, filed on Jun. 26, 2019.

(51) Int. Cl.
*G01M 17/00* (2006.01)
*B25J 9/16* (2006.01)
*H04N 9/31* (2006.01)

(52) U.S. Cl.
CPC .............. *G01M 17/00* (2013.01); *H04N 9/31* (2013.01); *B25J 9/1671* (2013.01); *B25J 9/1674* (2013.01); *G05B 2219/40323* (2013.01)

(58) Field of Classification Search
CPC ...... H04N 9/31; H04N 9/3185; H04N 9/3194; H04N 9/3147; G01M 17/00; B25J 9/1674; B25J 9/1671; G05B 2219/40323; G05B 2219/40317
See application file for complete search history.

(56) References Cited

U.S. PATENT DOCUMENTS

| | | | |
|---|---|---|---|
| 9,643,314 B2 * | 5/2017 | Guerin | B25J 9/1671 |
| 9,928,649 B2 * | 3/2018 | Hu | G08G 5/0013 |
| 10,667,659 B2 * | 6/2020 | Jung | B25J 9/0003 |
| 10,792,810 B1 * | 10/2020 | Beckman | B25J 9/163 |
| 11,119,498 B2 * | 9/2021 | Zapolsky | G01S 17/931 |

* cited by examiner

*Primary Examiner* — Khoi H Tran
*Assistant Examiner* — Christopher Scott
(74) *Attorney, Agent, or Firm* — Spano Law Group; Joseph S. Spano (57) ABSTRACT

Methods and systems for testing robotic systems in an environment blending both physical and virtual test environments are presented herein. A realistic, three dimensional physical environment for testing and evaluating a robotic system is augmented with simulated, virtual elements. In this manner, robotic systems, humans, and other machines dynamically interact with both real and virtual elements. In one aspect, a model of a physical test environment and a model of a virtual test environment are combined, and signals indicative of a state of the combined model are employed to control a robotic system. In a further aspect, a mobile robot present in a physical test environment is commanded to emulate movements of a virtual robot under control. In another further aspect, images of the virtual robot under control are projected onto the physical test environment to provide a visual representation of the presence and action taken by the virtual robot.

15 Claims, 9 Drawing Sheets

METHODS AND SYSTEMS FOR TESTING ROBOTIC SYSTEMS IN AN INTEGRATED PHYSICAL AND SIMULATED ENVIRONMENT

CROSS REFERENCE TO RELATED APPLICATIONS

The present application for patent claims priority under 35 U.S.C. § 119 from U.S. provisional patent application Ser. No. 62/866,892, entitled "Apparatus And Method Of Integrated Physical And Simulated Environment For Demonstrating And Testing Robotic Systems," filed Jun. 26, 2019, the subject matter of which is incorporated herein by reference in its entirety.

TECHNICAL FIELD

The described embodiments relate to systems and methods for testing robotic systems in complex environments.

BACKGROUND INFORMATION

Robotic systems are widely deployed to perform highly repetitive tasks, typically in well-controlled environments. In some examples of factory automation, a robot performs a single task repeatedly for long periods of time (e.g., months or years). However, robotic systems are not yet widely deployed to perform tasks in less structured, less predictable environments. To better integrate robotic systems into these environments, robotic systems must be able to adapt to new tasks and environmental conditions.

In some examples, robotic systems have been developed with increased intelligence to enable robotic systems to perform a wide range of tasks in unstructured environments. Intelligent robotic systems are able to better comprehend complex tasks and execute the task at hand with less instruction. In addition, improved user interfaces enhance communication between humans and a robotic system; enabling the collaborative robotic system to better understand the task at hand.

Successful deployment of intelligent robotic systems, such as autonomous vehicles and mobile manipulators, to a real application environment requires extensive testing and evaluation of the system under realistic operating conditions. Testing is critically important when the robotic system interacts with humans within the environment. Safety is a critical issue that must be validated thoroughly under various conditions, including extreme situations where humans behave erratically and irrationally. Furthermore, the application environment may be dynamically changing, uncertain, and unpredictable. Robotic systems that interact with humans in a dynamic environment should be tested under all conceivable conditions.

Conventionally, a simulation environment is employed to test and evaluate a new robotic system prior to introduction of the robotic system into a real environment. However, current simulation environments are unable to create realistic sensor signals produced by physical sensors in a real environment. In addition, current simulation environments are unable to model behaviors of complex entities, such as human behaviors. Furthermore, current simulation environments are unable to effectively display, demonstrate, and elucidate interactions among a number of factors and agents, including flow of materials, human-robot interactions, contingencies, and exceptional cases.

Currently, most simulation is done in a purely virtual environment. This approach has a number of limitations. For example, the simulated motion of a robotic device may not be accurate. In many scenarios, it is difficult to understand scale and how robotic systems will translate to the physical world.

Unfortunately, testing in a real, physical environment is often limited due to available time, resources, physical constraints, and safety requirements. It is often only possible to explore a very limited number of environmental situations and task scenarios. In particular, if such testing is to be performed at a commercial site, the testing may be very intrusive, dangerous, or both. Finally, it is difficult to test very specific scenarios with precise timing or motion of other objects in a physical environment.

As a result, testing solely in a simulated environment or in a real, physical environment does not assure successful and safe deployment of new robotic systems. However, it is important to test many situations, as accurately as possible, to assure safety.

In summary, improvements to testing environments are desired to enable rigorous testing of robotic systems before entry into complex, relatively unstructured task environments.

SUMMARY

Methods and systems for testing robotic systems in a robotic system testing environment blending both physical and virtual test environments are presented herein. Blending one or more real, physical environments with a virtual environment enables separation of robotic systems from potentially dangerous surrounding, or vice-versa, during testing of critical operational scenarios. In addition, blending one or more real, physical environments with a virtual environment enables demonstration of the capabilities of a robotic system in a real operating environment before deployment of an actual robotic system. In some embodiments, a realistic, three dimensional physical environment for testing and evaluating a robotic system is augmented with simulated, virtual elements. In this manner, robotic systems, humans, and other machines dynamically interact with both real and virtual elements.

In one aspect, a model of a physical test environment and a model of a virtual test environment are combined, and signals indicative of a state of the combined model are employed to control a robotic system. In this manner, a robotic system is controlled based on both measured elements of a physical environment and elements of a virtual environment.

In a further aspect, a mobile robot present in a physical test environment is commanded to emulate movements of a virtual robot under control. The mobile robot does not structurally correspond to the virtual robot under control.

In another further aspect, images of the virtual robot under control are projected onto the physical test environment to provide a visual representation of the presence and action taken by the virtual robot.

In another further aspect, a robot under control in a physical test environment is commanded to emulate movements of a virtual robot under control. The robot under control structurally corresponds to the virtual robot under control.

In another further aspect, a localization system tracks the location of a robot under control in a physical test environment and communicates signals indicative of the location as a function of time to a virtual model engine. In response, virtual model engine updates the position of a virtual robot under control in the virtual test environment to correspond with the position of the corresponding robot under control in the physical test environment.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for testing robotic systems in a robotic system testing environment blending both physical and virtual test environments are presented herein. Blending one or more real, physical environments with a virtual environment enables separation of robotic systems from potentially dangerous surrounding, or vice-versa, during testing of critical operational scenarios. In addition, blending one or more real, physical environments with a virtual environment enables demonstration of the capabilities of a robotic system in a real operating environment before deployment of an actual robotic system. In some embodiments, a realistic, three dimensional physical environment for testing and evaluating a robotic system is augmented with simulated, virtual elements. In this manner, robotic systems, humans, and other machines dynamically interact with both real and virtual elements.

Blending one or more real, physical environments with a virtual environment enables a robotic system and other machines to generate and react to real-time signals in a realistic physical environment. In addition, realistic human behaviors are measured as a human reacts to a real, physical environment including operating machines and robotic systems. Augmenting a real, physical environment with images or virtual objects or actual robotic systems enables simulation of a broad spectrum of diverse conditions and situations, including rare but critical situations for safety assurance. Furthermore, users of a robotic system tested in a blended testing environment can evaluate the system by observing the execution of realistic tasks, flow of materials, and usability of the system as well as experience human-robot interactions and all conceivable contingencies and emergencies in a realistic, three physical and virtual environment.

In one aspect, a model of a physical test environment and a model of a virtual test environment are combined, and signals indicative of a state of the combined model are employed to control a robotic system. In this manner, a robotic system is controlled based on both measured elements of a physical environment and elements of a virtual environment.

Figure 1:
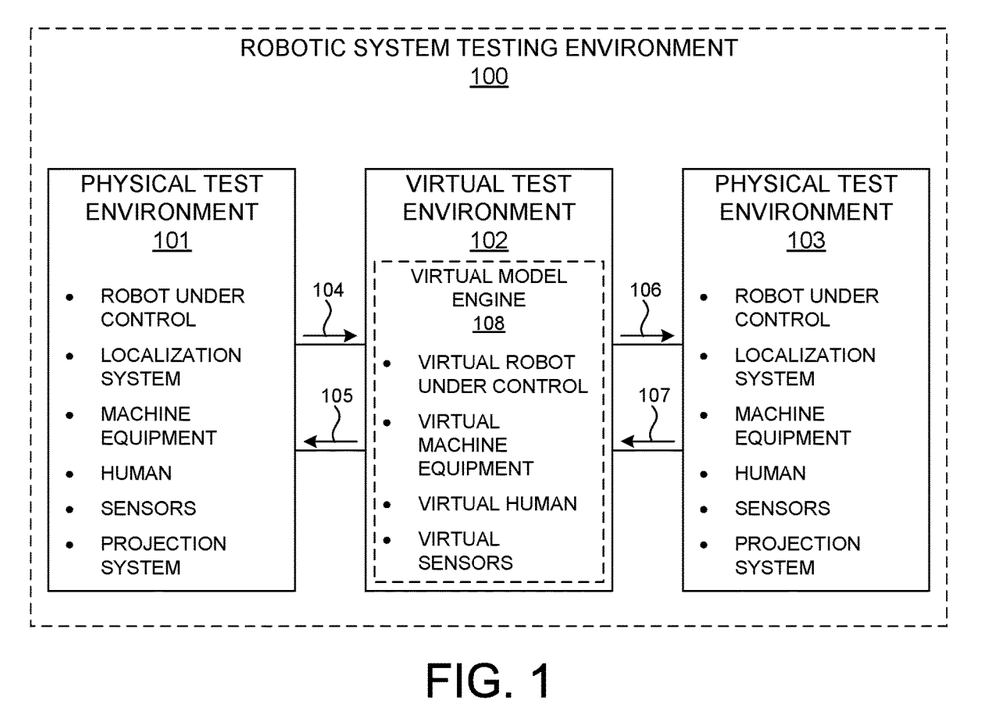
FIG. 1 depicts a diagram illustrative of a robotic system testing environment in one embodiment.

FIG. 1 depicts a diagram illustrative of a robotic system testing environment 100 in one embodiment. Robotic system testing environment 100 includes a physical test environment 101, a virtual test environment 102, and another physical test environment 103. In general, physical test environment 101 includes at least one of a robot under control, a localization system, machine equipment, a human, one or more sensor systems, and a projection system. Similarly, physical test environment 101 includes at least one of a robot under control, a localization system, machine equipment, a human, one or more sensor systems, and a projection system. Virtual test environment 102 includes a virtual model engine 108 operating on one or more computing systems. Virtual model engine 108 receives signals 104 and 107 from and communicates signals 105 and 106 to physical test environments 101 and 103, respectively, and computes a combined model characterizing both the physical and virtual test environments. Elements of the combined model include at least one of a virtual robot under control, virtual machine equipment, a virtual human, and a virtual sensor system.

Figure 2:
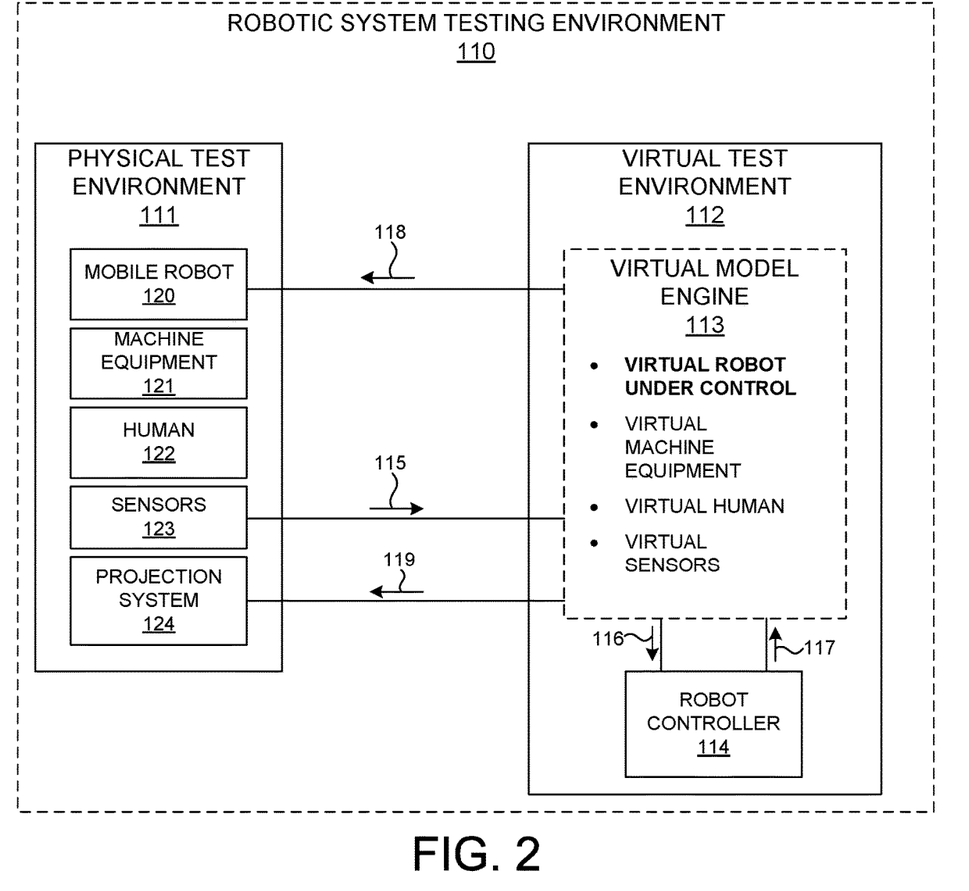
FIG. 2 depicts a diagram illustrative of a robotic system testing environment in another embodiment.

FIG. 2 depicts a diagram illustrative of a robotic system testing environment 110 in another embodiment. Robotic system testing environment 110 includes a physical test environment 111 and a virtual test environment 112. Physical test environment 111 includes a mobile robot 120, machine equipment 121, one or more humans 122, one or more sensor systems 123, and one or more projection systems 124. Virtual test environment 112 includes a virtual model engine 113 operating on one or more computing systems and a physical robot controller 114. Robot controller operates in conjunction with virtual model engine 113 as a hardware-in-the-loop simulation element, receiving signals 116 from virtual model engine 113 and transmitting signals 117 back to virtual model engine 113.

Figure 3A:
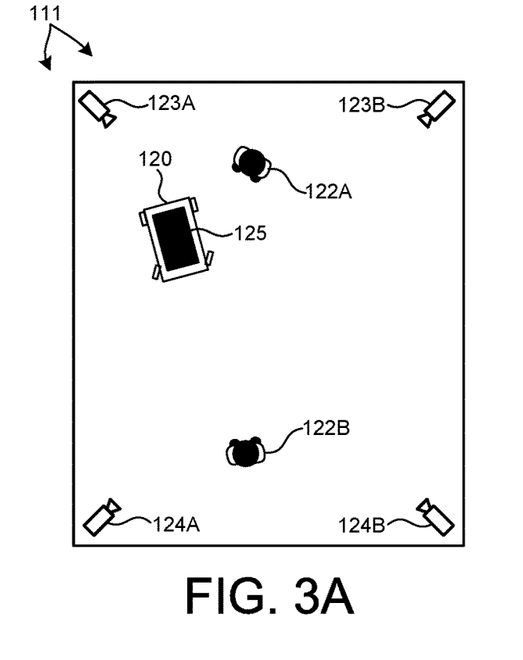
FIG. 3A depicts an illustration of physical test environment in one embodiment.
Figure 3B:
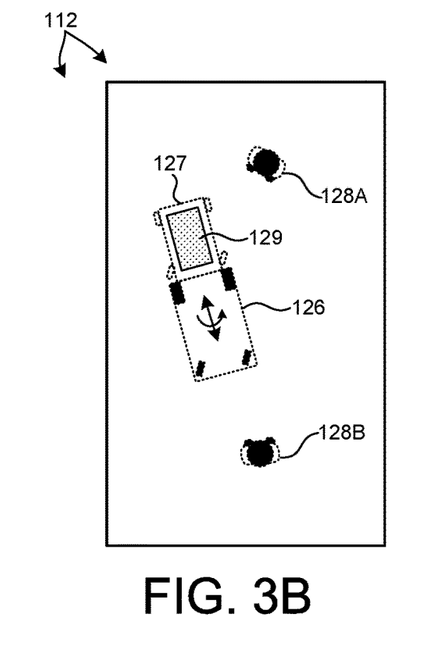
FIG. 3B depicts an illustration of a virtual environment including virtual representations of elements of the physical environment depicted in FIG. 3A.

In the embodiment depicted in FIG. 2, signals 115 are communicated from one or more sensor systems 123 to virtual model engine 113. Signals 115 indicate a physical state of the elements of the physical test environment 111. In some embodiments, a sensor system 123 includes a network of cameras that collect images indicative of the locations of elements of physical test environment 111. For example, FIG. 3A depicts an illustration of physical test environment 111 in one embodiment. Camera system 123 includes cameras 123A and 123B that generate images indicative of the locations of mobile robot 120 and humans 122A and 122B in physical test environment 111. In this embodiment, virtual model engine 113 receives signals 115 indicative of the locations of mobile robot 120 and humans 122A and 122B from cameras 123A and 123B. Virtual model engine 113 determines a state of a model of the elements of the physical test environment 111 based on the received signals 115. In addition, virtual model engine 113 determines a state of the virtual test environment 112 including the state of at least one virtual element (e.g., a virtual robot under control, virtual machine equipment, a virtual human, a virtual sensor, etc.). Virtual model engine 113 combines the models of the elements of both the physical and virtual environments to model the physical environment augmented by one or more virtual objects. FIG. 3B depicts an illustration of virtual environment 112 including virtual representations of elements of the physical environment 111. For example, humans 128A and 128B are virtual representations of humans 122A and 122B. Mobile robot 127 is a virtual representation of mobile robot 120, and payload 129 is a virtual representation of payload 125 disposed on mobile robot 120. In addition, virtual environment 112 includes a virtual robot under control 126 operating to move payload 129.

Virtual model engine 113 generates control signals 118 indicative of a desired movement of payload 129 to virtual robot under control 126 that causes virtual robot under control 126 to move payload 129 in the desired manner in the virtual test environment 112. Thus, virtual model engine 113 simulates a movement of virtual payload 129 by virtual robot under control 126.

In a further aspect, virtual model engine 113 communicates control signals 118 to mobile robot 120. In response, mobile robot 120 moves payload 125 in the physical test environment in accordance with the same desired movement of payload 129. In this manner, mobile robot 120 emulates the movement of virtual robot under control 126 in the physical test environment 111.

Figure 3C:
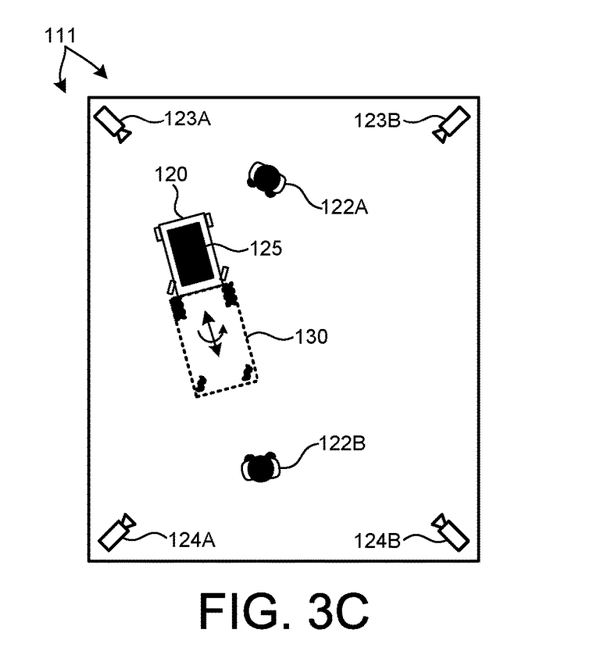
FIG. 3C depicts another illustration of the physical test environment depicted in FIG. 3A, including an image of a virtual robot under control.

In another further aspect, virtual model engine 113 communicates signals 119 to projection system 124. In response projection system 124 projects an image of the virtual robot under control 126 in the physical test environment 111. FIG. 3C depicts an illustration of physical test environment 111 including an image 130 of virtual robot under control 126 projected by projector devices 124A and 124B. In some embodiments, projection system 124 is a three dimensional, holographic projection system. In some embodiments, projection system 124 is a two dimensional projection system, such as a liquid crystal display system that projects a two dimensional image of the virtual robot under control 126 onto a floor of physical test environment 111.

Figure 4:
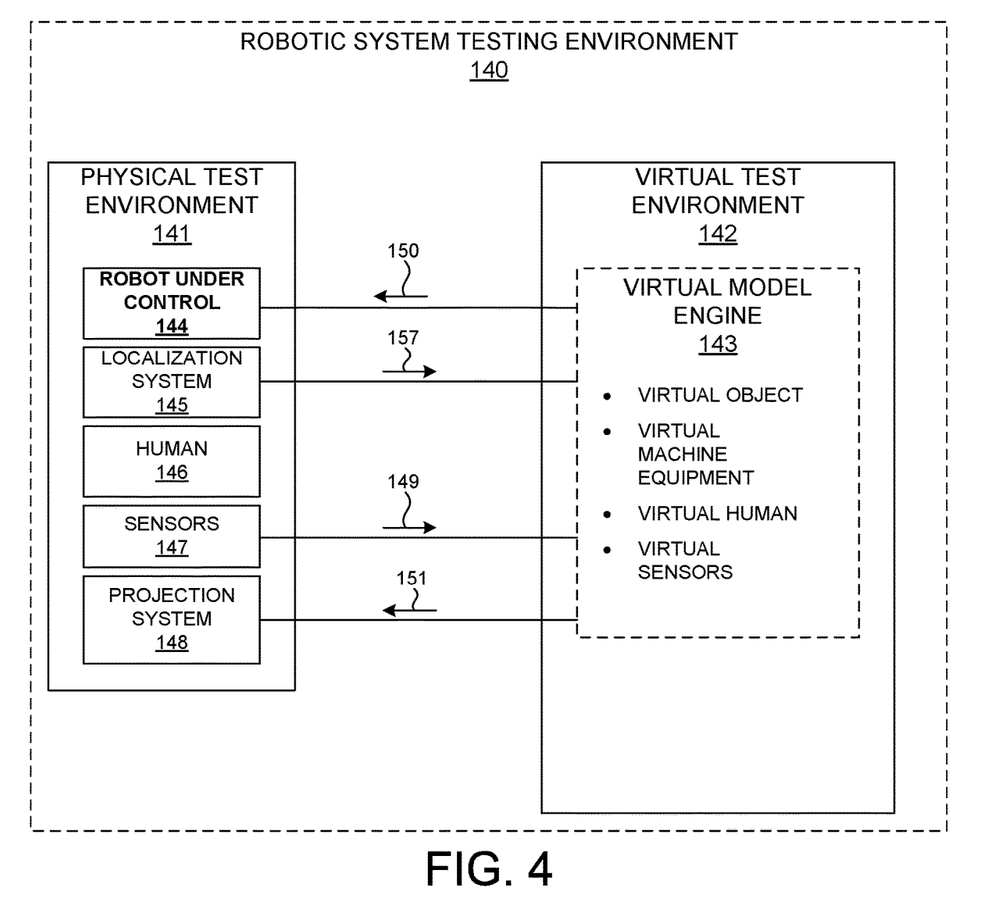
FIG. 4 depicts a diagram illustrative of a robotic system testing environment in another embodiment.

FIG. 4 depicts a diagram illustrative of a robotic system testing environment 140 in another embodiment. Robotic system testing environment 140 includes a physical test environment 141 and a virtual test environment 142. Physical test environment 141 includes a robot under control 144, localization system 145, one or more humans 145, one or more sensor systems 147, and one or more projection systems 148. Virtual test environment 142 includes a virtual model engine 143 operating on one or more computing systems.

Figure 5A:
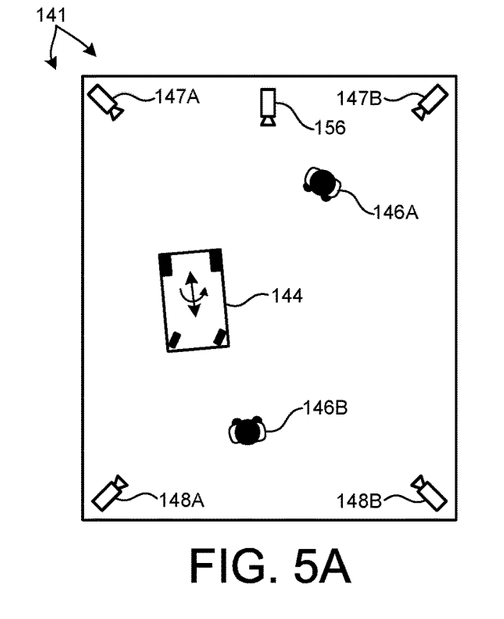
FIG. 5A depicts an illustration of a physical test environment in another embodiment.
Figure 5B:
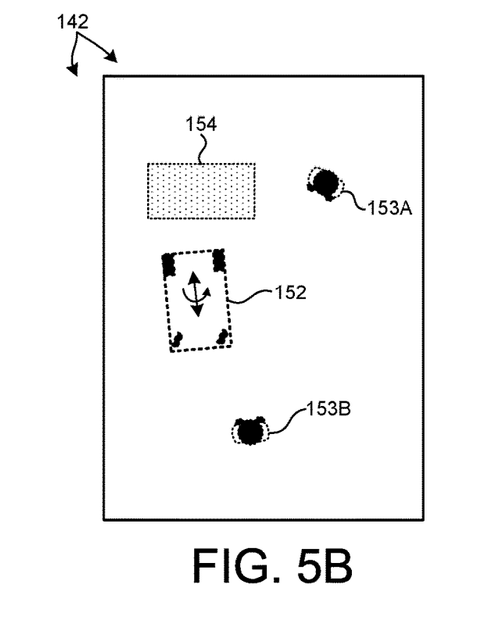
FIG. 5B depicts an illustration of a virtual environment including virtual representations of elements of the physical environment depicted in FIG. 5A.

In the embodiment depicted in FIG. 4, signals 149 are communicated from one or more sensor systems 147 to virtual model engine 143. Signals 149 indicate a physical state of the elements of the physical test environment 141. In some embodiments, a sensor system 147 includes a network of cameras that collect images indicative of the locations of elements of physical test environment 141. For example, FIG. 5A depicts an illustration of physical test environment 141 in one embodiment. Camera system 147 includes cameras 147A and 147B that generate images indicative of the locations of robot under control 144 and humans 146A and 146B in physical test environment 141. In this embodiment, virtual model engine 143 receives signals 149 indicative of the locations of robot under control 144 and humans 146A and 146B from cameras 147A and 147B. Virtual model engine 143 determines a state of a model of the elements of the physical test environment 141 based on the received signals 149. In addition, virtual model engine 143 determines a state of the virtual test environment 142 including the state of at least one virtual element (e.g., a virtual object, virtual machine equipment, a virtual human, a virtual sensor, etc.). Virtual model engine 143 combines the models of the elements of both the physical and virtual environments to model the physical environment augmented by one or more virtual objects. FIG. 5B depicts an illustration of virtual environment 142 including virtual representations of elements of the physical environment 141. For example, humans 153A and 153B are virtual representations of humans 146A and 146B. Virtual robot under control 152 is a virtual representation of robot under control 144. In addition, virtual environment 142 includes a virtual object 154.

Virtual model engine 143 generates control signals 150 indicative of a desired movement of virtual robot under control 152 that causes virtual robot under control 152 to move to avoid object 154 and humans 153A and 153B in the desired manner in the virtual test environment 142. Thus, virtual model engine 143 simulates a movement of virtual robot under control 152.

In a further aspect, virtual model engine 143 communicates control signals 150 to robot under control 144. In response, robot under control 144 moves in the physical test environment in accordance with the same desired movement of virtual robot under control 152. In this manner, robot under control 144 emulates the movement of virtual robot under control 152 in the physical test environment 141.

In another further aspect, localization system 156 tracks the location of robot under control 144 in physical test environment 141 and communicates signals 157 indicative of the location as a function of time to virtual model engine 143. In response, virtual model engine 143 updates the position of virtual robot under control 152 in the virtual test environment 142 to correspond with the position of robot under control 144 in physical test environment 141.

Figure 5C:
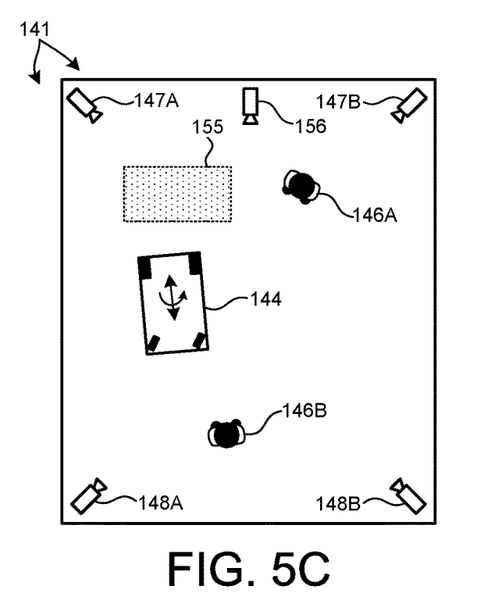
FIG. 5C depicts an illustration of the physical test environment depicted in FIG. 5A, including an image of a virtual object.

In another further aspect, virtual model engine 143 communicates signals 151 to projection system 148. In response projection system 148 projects an image of virtual object 154 in the physical test environment 141. FIG. 5C depicts an illustration of physical test environment 141 including an image 155 of virtual object 154 projected by projector devices 148A and 148B. In some embodiments, projection system 148 is a three dimensional, holographic projection system. In some embodiments, projection system 148 is a two dimensional projection system, such as a liquid crystal display system that projects a two dimensional image 155 of the virtual object 154 onto a floor of physical test environment 141.

Figure 6:
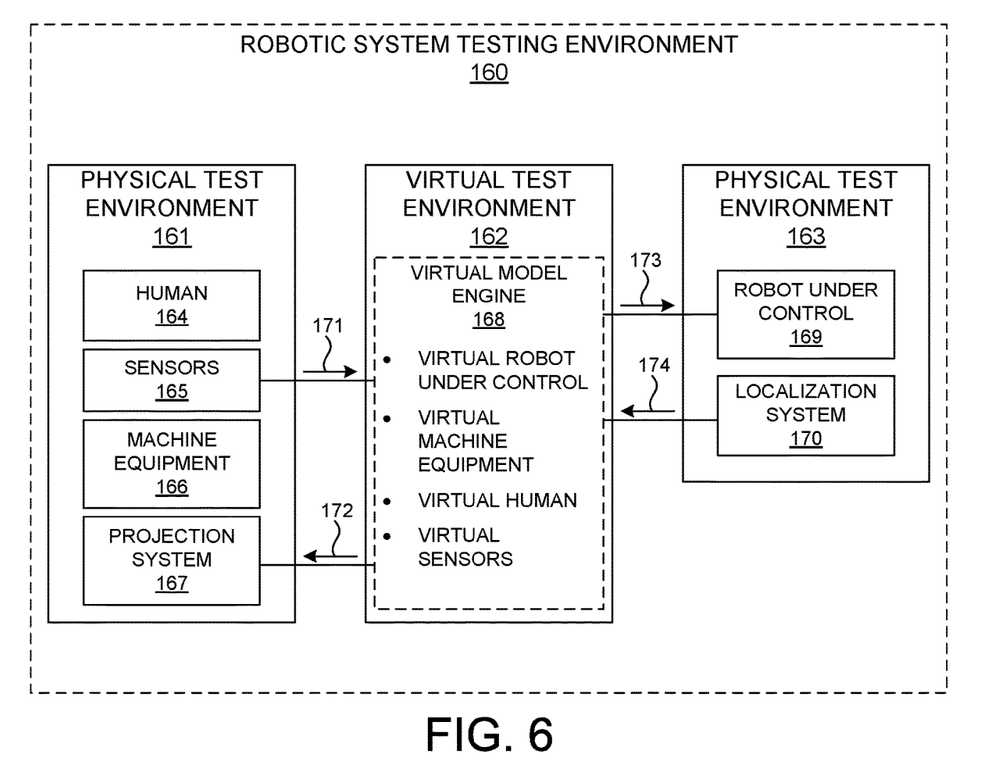
FIG. 6 depicts a diagram illustrative of a robotic system testing environment in another embodiment.

FIG. 6 depicts a diagram illustrative of a robotic system testing environment 160 in another embodiment. Robotic system testing environment 160 includes a physical test environment 161, a virtual test environment 162, and another physical test environment 163. Physical test environment 161 includes one or more humans 164, one or more sensor systems 165, machine equipment 166, and one or more projection systems 167. Virtual test environment 162 includes a virtual model engine 168 operating on one or more computing systems. Physical test environment 163 includes a robot under control 169 and a localization system 170.

Figure 7A:
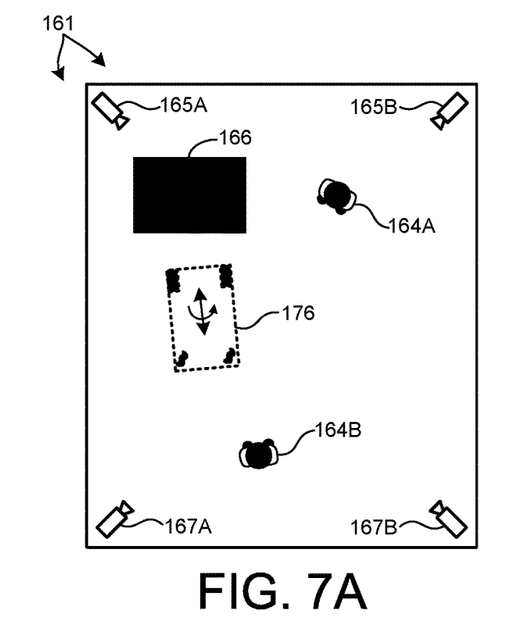
FIG. 7A depicts an illustration of a physical test environment in another embodiment.
Figure 7B:
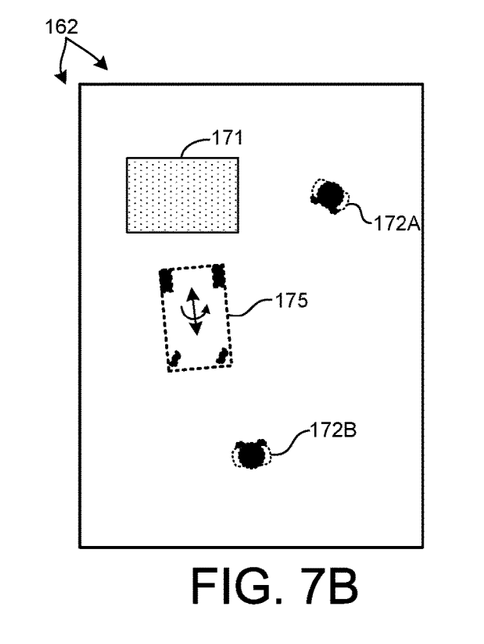
FIG. 7B depicts an illustration of a virtual environment including virtual representations of elements of the physical environment depicted in FIG. 7A.

In the embodiment depicted in FIG. 6, signals 171 are communicated from one or more sensor systems 165 to virtual model engine 168. Signals 171 indicate a physical state of the elements of the physical test environment 161. In some embodiments, a sensor system 165 includes a network of cameras that collect images indicative of the locations of elements of physical test environment 161. For example, FIG. 7A depicts an illustration of physical test environment 161 in one embodiment. Camera system 165 includes cameras 165A and 165B that generate images indicative of the locations of objects in the physical test environment 161 including humans 164A and 164B and machine equipment 166. In this embodiment, virtual model engine 168 receives signals 171 indicative of the machine equipment 166 and humans 164A and 164B from cameras 165A and 165B. Virtual model engine 168 determines a state of a model of the elements of the physical test environment 161 based on the received signals 171. In addition, virtual model engine 168 determines a state of the virtual test environment 162 including the state of at least one virtual element (e.g., a virtual robot under control, virtual machine equipment, a virtual human, a virtual sensor, etc.). Virtual model engine 168 combines the models of the elements of both the physical and virtual environments to model the physical environment augmented by one or more virtual objects. FIG. 7B depicts an illustration of virtual environment 162 including virtual representations of elements of the physical environment 161. For example, humans 172A and 172B are virtual representations of humans 164A and 164B. Virtual machine equipment 171 is a virtual representation of machine equipment 166. In addition, virtual environment 162 includes a virtual robot under control 175.

Virtual model engine 168 generates control signals 173 indicative of a desired movement of virtual robot under control 175 that causes virtual robot under control 175 to move among machine equipment object 171 and humans 172A and 172B in the desired manner in the virtual test environment 162. Thus, virtual model engine 168 simulates a movement of virtual robot under control 175.

Figure 7C:
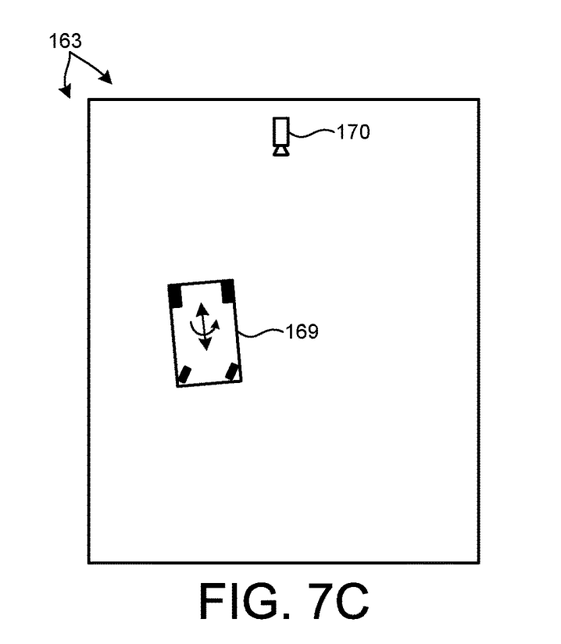
FIG. 7C depicts a robot under control operating in a physical test environment different from the physical test environment depicted in FIG. 7A.

In a further aspect, virtual model engine 168 communicates control signals 173 to robot under control 169. In response, robot under control 169 moves in the physical test environment 163 in accordance with the same desired movement of virtual robot under control 175. In this manner, robot under control 169 emulates the movement of virtual robot under control 175 in the physical test environment 163. FIG. 7C depicts robot under control 169 operating in physical task environment 163.

In another further aspect, localization system 170 tracks the location of robot under control 169 in physical test environment 163 and communicates signals 174 indicative of the location as a function of time to virtual model engine 168. In response, virtual model engine 168 updates the position of virtual robot under control 175 in the virtual test environment 162 to correspond with the position of robot under control 169 in physical test environment 163.

In another further aspect, virtual model engine 168 communicates signals 172 to projection system 167. In response projection system 167 projects an image 176 of robot under control 169 in the physical test environment 161. FIG. 7A depicts an illustration of physical test environment 161 including an image 176 of robot under control 169 projected by projector devices 167A and 167B. In some embodiments, projection system 167 is a three dimensional, holographic projection system. In some embodiments, projection system 167 is a two dimensional projection system, such as a liquid crystal display system that projects a two dimensional image of the robot under control 169 onto a floor of physical test environment 161.

In some embodiments, images of a virtual element, such as a virtual robot under control or a virtual object, are projected onto a physical test environment as described hereinbefore. In some of these embodiments, one or more sensing systems operating in the physical test environment capture information such as position, velocity, etc., associated with the projected images and communicate the information to the virtual model engine. For example, one or more cameras may capture the position of the imaged object over time. The virtual model engine may use this information to determine sensor signals employed to control a real or virtual robot.

As described herein, images of virtual objects may be projected onto a physical task environment to allow humans or sensing systems to visualize movements of a virtual object in the physical task environment. For example, projectors project simulated images of the virtual environment, including flow of materials and workpieces, outlook and state of virtual, simulated robots and other machines, and relevant background images. In some embodiments, projectors include three dimensional holographic projectors that project objects in three dimensions, including materials and workpieces being handled and transported by robots, fixtures and walls in the virtual environment, and robots and other machines working in the test environment. In addition, images of virtual objects may be projected onto multiple physical task environments to allow humans or sensing systems to visualize movements of a virtual object in multiple physical task environments (e.g., physical task environments 161 and 163).

However, in general, the projection of images in a physical task environment is optional, and the projection of images in a physical task environment is optional in any of the embodiments described herein.

As described herein, a robot, such as a mobile robot, may be deployed in a physical task environment to allow humans or sensing systems to visualize movements of a robot under control in another physical test environment or movements of a virtual robot under control. In these examples, the robot emulates the movements of a virtual robot under control or a robot under control in another physical test environment. In addition, robots may be deployed in multiple physical task environments to allow humans or sensing systems to visualize movements of a virtual robot under control or a robot under control in another physical test environment in multiple physical task environments.

However, in general, the deployment of robots in a physical task environment to emulate a virtual robot under control or a robot under control in another physical test environment is optional, and the deployment of robots to emulate a virtual robot under control or a robot under control in another physical test environment is optional in any of the embodiments described herein.

In some embodiments, the movements of robots emulating an actual robot under control are scaled relative to movements of the actual robot under control. For example, an emulation robot may operate in a large factory environment, while the robot under control operates in a relatively small laboratory room. In these embodiments, it may be advantageous to scale up movements made by the robot under control in the laboratory environment to larger movements in the factory environment.

In general, a suite of sensors is distributed over the physical test environment. In some embodiments, the sensors include sensors mounted on robots under control, and other machines operating in the physical test environment. These sensors include encoders, proximity sensors, cameras, accelerometers, etc. Sensor data collected from these sensors is communicated to a virtual model engine to update the state of a model of all relevant elements of the physical test environment.

In some embodiments, a centralized or distributed computing system executes the virtual model engine, which integrates the physical and virtual environments and executes experiments. In these embodiments, the computing system collects sensor signals and information from various sensor nodes fixed to the physical test environments, builds and updates a physical environment model based on the sensor data, and builds and updates a virtual, simulated model of the environment to include elements and scenarios required for testing. In addition, the computing system modifies sensor signals based on both physical and virtual models to emulate sensor signals that would emerge if virtual objects and conditions exist in the physical environment. Robots and other machines are controlled based on the modified sensor signals in real time.

In some embodiments, virtual, simulated objects are transported and manipulated with physical robots in a physical test environment where the robots are controlled based on real physical sensor signals modified by integrating a virtual environment model, including simulated humans working nearby.

In some embodiments, real, physical objects are transported and manipulated with virtual, simulated robots, where physical objects are moved with additional, physical vehicles that emulate movements of the physical objects.

In some embodiments, behaviors of real humans are experimentally observed and evaluated by exposing them to the physical test environment augmented with virtual, simulated robots and objects. In some examples, real humans interact with virtual robots and objects projected in three dimensional space with holographic projectors to evaluate safety and usability.

A computing system is employed to receive sensor signal data from one or more physical test environments, build and update the combined physical and virtual test models, and communicate command signals to various elements of one or more physical test environments as described herein. In some embodiments, many elements of the physical test environment include computing systems dedicated to control the function of that particular element, e.g., a mobile robot, a robot under control, a camera system, a projection system, etc.

Figure 8:
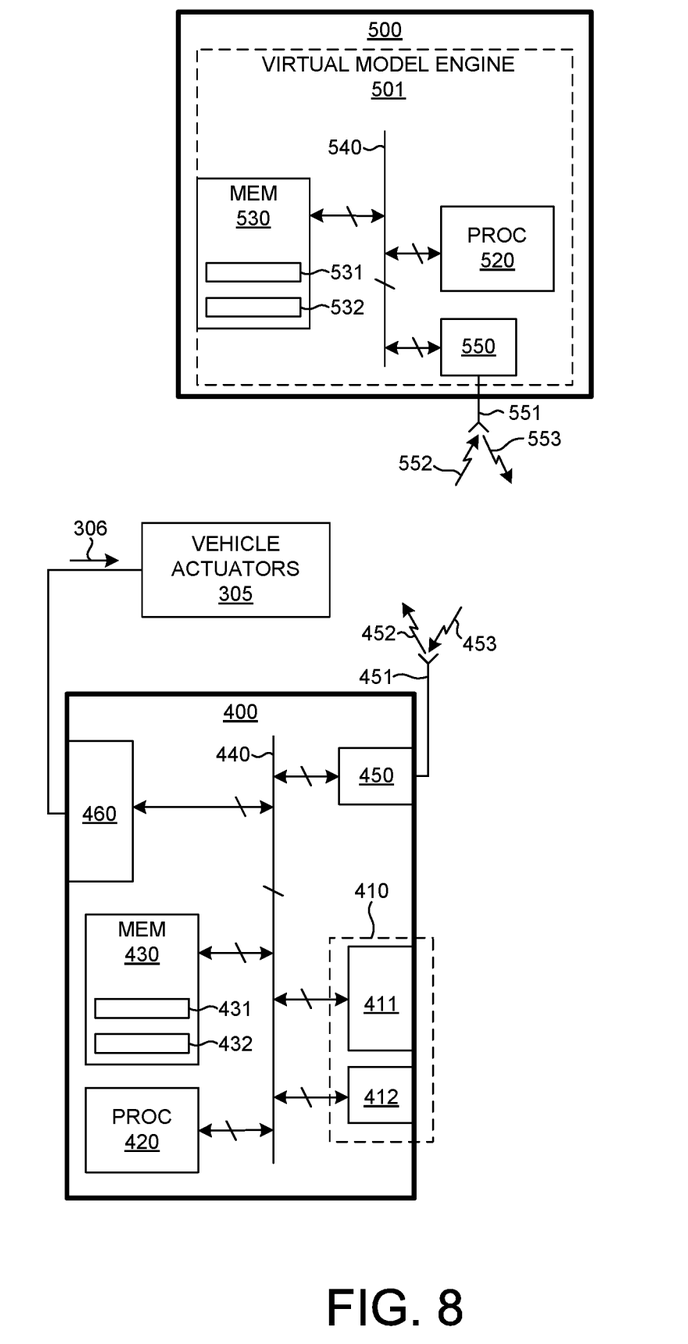
FIG. 8 depicts an illustration of computing systems employed to implement robotic testing including integrated physical and virtual environments as described herein.

As depicted in FIG. 8, a robot under control includes a computing system 400 including a sensor interface 410, at least one processor 420, a memory 430, a bus 440, a wireless communication transceiver 450, and a controlled device interface 460. Sensor interface 410, processor 420, memory 430, wireless communication transceiver 450, and controlled device interface 460 are configured to communicate over bus 440.

Sensor interface 410 includes analog to digital conversion (ADC) electronics 411. In addition, in some embodiments, sensor interface 410 includes a digital input/output interface 412. In some other embodiments, sensor interface 410 includes a wireless communications transceiver (not shown) configured to communicate with a sensor to receive measurement data from the sensor.

Controlled device interface 460 includes appropriate digital to analog conversion (DAC) electronics. In addition, in some embodiments, controlled device interface 460 includes a digital input/output interface. In some other embodiments, controlled device interface 460 includes a wireless communications transceiver configured to communicate with a device, including the transmission of control signals.

As depicted in FIG. 8, controlled device interface 460 is configured to transmit control commands 306 to one or more vehicle actuators 305 that cause the robot under control to move, for example, along a desired motion trajectory.

Memory 430 includes an amount of memory 431 that stores sensor data employed by the robot under control, e.g., encoder data, image data, etc. Memory 430 also includes an amount of memory 432 that stores program code that, when executed by processor 420, causes processor 420 to implement movement functionality as described herein.

In some examples, processor 420 is configured to store digital signals generated by sensor interface 410 onto memory 430. In addition, processor 420 is configured to read the digital signals stored on memory 430 and transmit the digital signals to wireless communication transceiver 450. In some embodiments, wireless communications transceiver 450 is configured to communicate the digital signals from computing system 400 to computing system 500, or another external computing device (not shown) over a wireless communications link. As depicted in FIG. 8, wireless communications transceiver 450 transmits a radio frequency signal 452 over antenna 451. The radio frequency signal 452 includes digital information indicative of the digital signals to be communicated from computing system 400 to computing system 500.

In some embodiments, wireless communications transceiver 450 is configured to receive digital signals from server 500, or an external computing device (not shown) over a wireless communications link. The radio frequency signals 453 include digital information (e.g., motion control commands) indicative of the digital signals to be communicated from server 500, or an external computing system (not shown) to computing system 400.

By way of non-limiting example, computing system 500 is employed as a virtual model engine 501 to receive sensor signal data from one or more physical test environments, build and update the combined physical and virtual test models, and communicate command signals to various elements of one or more physical test environments as described herein.

As depicted in FIG. 8, computing system 500 includes at least one processor 520, a memory 530, a bus 540, and a wireless communication transceiver 550 operating as a virtual model engine 501. Processor 520, memory 530, and wireless communication transceiver 550 are configured to communicate over bus 540.

In some embodiments, memory 530 includes an amount of memory 531 that stores sensor data collected from one or more elements of a physical test environment. Memory 530 also includes an amount of memory 532 that stores program code that, when executed by processor 520, causes processor 520 to perform integrated physical and virtual robotic system test functionality as described herein.

In some examples, processor 520 is configured to store digital signals received from one or more sensors located in a physical test environment onto memory 530. In some embodiments, processor 520 is configured to store digital signals received from computing system 400 onto memory 530. In addition, processor 520 is configured to read the digital signals stored on memory 530 and transmit the digital signals to wireless communication transceiver 550. In some embodiments, wireless communications transceiver 550 is configured to communicate the digital signals from server 500 to computing system 400, or an external computing device (not shown) over a wireless communications link. As depicted in FIG. 8, wireless communications transceiver 550 transmits a radio frequency signal 552 over antenna 551. The radio frequency signal 552 includes digital information indicative of the digital signals (e.g., motion control commands) to be communicated from server 500 to computing system 400, an external computing device, etc.

In some embodiments, wireless communications transceiver 550 is configured to receive digital signals from computing system 400, or an external computing device (not shown) over a wireless communications link. The radio frequency signals 553 includes digital information indicative of the digital signals (e.g., current position within the physical test environment) to be communicated from computing system 400, or an external computing system (not shown) to server 500.

The computing systems 400 and 500 may include, but are not limited to, a personal computer system, mainframe computer system, a cloud-based computing system, workstation, image computer, parallel processor, or any other computing device known in the art. In general, the term "computing system" may be broadly defined to encompass any device, or combination of devices, having one or more processors, which execute instructions from a memory medium. In general, computing systems 400 and 500 may be integrated with a robot, such as a robot under control, or alternatively, may be separate, entirely, or in part, from any robot. In this sense, computing systems 400 and 500 may be remotely located and receive data, transmit data, and transmit command signals to any element of a robotic system testing environment.

Figure 9:
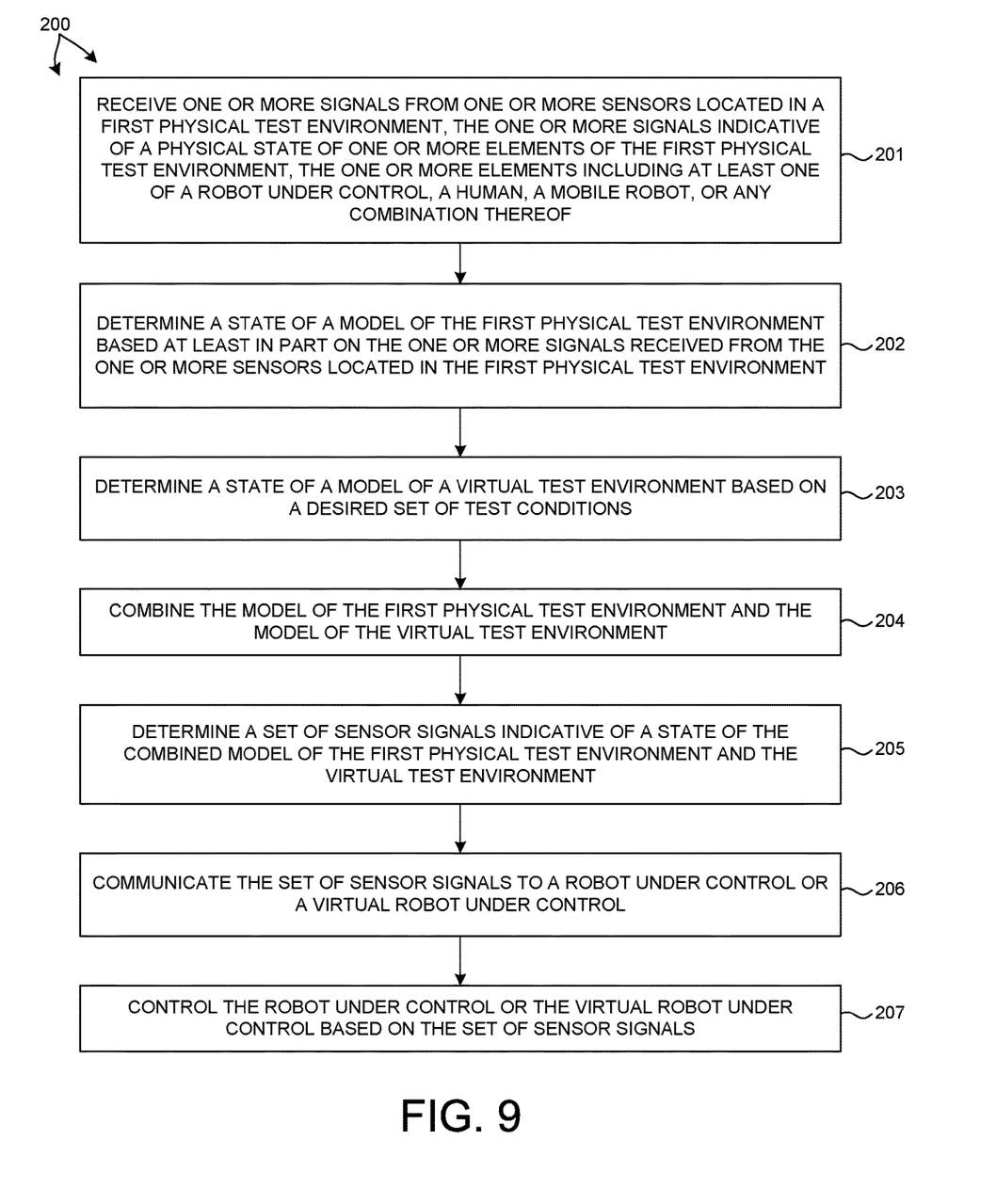
FIG. 9 illustrates a flowchart of a method 200 of robotic testing including integrated physical and virtual environments as described herein.

FIG. 9 illustrates a flowchart of a method 200 suitable for implementation by a robotic testing system as described herein. In some embodiments, robotic system testing environments described with reference to FIGS. 1-7 are operable in accordance with method 200 illustrated in FIG. 9. However, in general, the execution of method 200 is not limited to the embodiments of the robotic system testing environments described with reference to FIGS. 1-7. These illustrations and corresponding explanation are provided by way of example as many other embodiments and operational examples may be contemplated within the scope of this patent document.

In block 201, one or more signals are received from one or more sensors located in a first physical test environment. The one or more signals are indicative of a physical state of one or more elements of the first physical test environment. The one or more elements include at least one of a robot under control, a human, a mobile robot, or any combination thereof.

In block 202, a state of a model of the first physical test environment is determined based at least in part on the one or more signals received from the one or more sensors located in the first physical test environment.

In block 203, a state of a model of a virtual test environment is determined based on a desired set of test conditions.

In block 204, the model of the first physical test environment is combined with the model of the virtual test environment.

In block 205, a set of sensor signals indicative of a state of the combined model of the first physical test environment and the virtual test environment is determined.

In block 206, the set of sensor signals is communicated to a robot under control or a virtual robot under control.

In block 207, the robot under control or the virtual robot under control is controlled based on the set of sensor signals.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A robotic system testing environment, comprising:
  a first physical test environment including one or more sensors and one or more elements, the one or more element including at least one of a robot under control, a human, a stationary object, a mobile object, or any combination thereof;
  a virtual test environment including at least one of a virtual robot under control, a virtual human, a virtual, stationary object, a virtual, mobile object, one or more virtual sensors, or any combination thereof;

one or more image projection devices located in the first physical test environment; and
a computing system configured to:
receive one or more signals from the one or more sensors located in the first physical test environment, the one or more signals indicative of a physical state of the one or more elements of the first physical test environment;
determine a state of a model of the first physical test environment based at least in part on the one or more signals received from the one or more sensors located in the first physical test environment;
determine a state of a model of the virtual test environment based on a desired set of test conditions;
combine the model of the first physical test environment and the model of the virtual test environment to generate a combined model of the first physical test environment and the virtual test environment;
determine a set of sensor signals indicative of a state of the combined model of the first physical test environment and the virtual test environment;
communicate the set of sensor signals to a robot under control or a virtual robot under control;
control the robot under control or the virtual robot under control based on the set of sensor signals; and
communicate image signals indicative of a state of at least one of the virtual robot under control, the virtual human, the virtual, stationary object, and the virtual, mobile object to the one or more image projection devices, wherein the one or more image projection devices project an image indicative of the state of the at least one of the virtual robot under control, the virtual human, the virtual, stationary object, and the virtual, mobile object onto the first physical test environment, and wherein the one or more signals from the one or more sensors located in the first physical test environment are indicative of the image indicative of the state of the at least one of the virtual robot under control, the virtual human, the virtual, stationary object, and the virtual, mobile object projected onto the first physical test environment.

2. The robotic system testing environment of claim 1, wherein the one or more image projection devices include a three dimensional, holographic imaging device.

3. The robotic system testing environment of claim 1, wherein the first physical test environment includes a robot under control, wherein the virtual test environment includes a virtual human, wherein an image indicative of a state of the virtual human is projected onto the first physical test environment, and wherein the robot under control in the first physical test environment is controlled to move in response to the state of the virtual human.

4. The robotic system testing environment of claim 1, wherein the virtual test environment includes a virtual robot under control, and wherein an image indicative of a state of the virtual robot under control is projected onto the first physical test environment by the one or more image projection devices.

5. The robotic system testing environment of claim 4, the computing system further configured to:
communicate the set of sensor signals indicative of the state of the combined model to a physical robot control subsystem, wherein the physical robot control subsystem controls the virtual robot under control based on the set of sensor signals.

6. The robotic system testing environment of claim 4, the first physical test environment including a payload disposed on a mobile robot, and wherein the computing system is further configured to:
command the mobile robot to move the payload robot under control in the first physical test environment in accordance with a virtual movement of the virtual robot under control.

7. The robotic system testing environment of claim 4, wherein the first physical test environment includes a human, wherein the virtual robot under control in the virtual test environment is controlled to virtually move in response to the state of the human, and wherein the one or more image projection devices display a sequence of images indicative of the movement of the virtual robot under control in the first physical test environment.

8. The robotic system testing environment of claim 1, further comprising:
a second physical test environment including a first robot under control, wherein the set of sensor signals is communicated to the first robot under control, and wherein the first robot under control is controlled based on the set of sensor signals.

9. The robotic system testing environment of claim 8, further comprising:
one or more image projection devices located in the second physical test environment, the computing system further configured to:
communicate image signals indicative of a state of the one or more elements of the first physical test environment to the one or more image projection devices, wherein the one or more image projection devices project an image indicative of the state of the one or more elements of the first physical test environment onto the second physical test environment.

10. The robotic system testing environment of claim 8, wherein the first physical test environment includes a second robot under control, and wherein the computing system is further configured to:
command the second robot under control to move in accordance with a movement of the first robot under control.

11. A method comprising:
receiving one or more signals from one or more sensors located in a first physical test environment, the one or more signals indicative of a physical state of one or more elements of the first physical test environment, the one or more elements including at least one of a robot under control, a human, a mobile robot, or any combination thereof;
determining a state of a model of the first physical test environment based at least in part on the one or more signals received from the one or more sensors located in the first physical test environment;
determining a state of a model of a virtual test environment based on a desired set of test conditions;
combining the model of the first physical test environment and the model of the virtual test environment to generate a combined model of the first physical test environment and the virtual test environment;
determining a set of sensor signals indicative of a state of the combined model of the first physical test environment and the virtual test environment;
communicating the set of sensor signals to a robot under control or a virtual robot under control;

controlling the robot under control or the virtual robot under control based on the set of sensor signals;

communicating image signals indicative of a state of at least one element of the virtual test environment to one or more image projection devices disposed in the first physical test environment; and projecting an image indicative of the state of the at least one element of the virtual test environment onto the first physical test environment, wherein the at least one element of the virtual test environment is any of a virtual robot under control, a virtual human, a virtual, stationary object, and a virtual, mobile object, wherein the one or more signals from the one or more sensors located in the first physical test environment are indicative of the image indicative of the state of the at least one element of the virtual test environment projected onto the first physical test environment.

12. The method of claim 11, wherein the virtual test environment includes a virtual robot under control, and wherein the image projected onto the first physical test environment is indicative of the state of the virtual robot under control.

13. The method of claim 11, further comprising:
communicating a control command to a mobile robot in the first physical test environment to move a payload disposed on the mobile robot in accordance with a virtual movement of a virtual robot under control in the virtual test environment.

14. The method of claim 11, further comprising:
communicating the set of sensor signals to a first robot under control in a second physical test environment different from the first physical test environment; and
controlling the first robot under control based on the set of sensor signals.

15. A robotic system testing environment, comprising:
a first physical test environment including one or more sensors and one or more elements, the one or more elements including at least one of a robot under control, a human, a stationary object, a mobile object, or any combination thereof;
a virtual test environment including at least one of a virtual robot under control, a virtual human, a virtual, stationary object, a virtual, mobile object, one or more virtual sensors, or any combination thereof;
one or more image projection devices located in the first physical test environment; and
a non-transitory, computer-readable medium storing instructions that when executed by one or more processors cause the one or more processors to:
receive one or more signals from the one or more sensors located in the first physical test environment, the one or more signals indicative of a physical state of one or more elements of the first physical test environment;
determine a state of a model of the first physical test environment based at least in part on the one or more signals received from the one or more sensors located in the first physical test environment;
determine a state of a model of the virtual test environment based on a desired set of test conditions;
combine the model of the first physical test environment and the model of the virtual test environment to generate a combined model of the first physical test environment and the virtual test environment;
determine a set of sensor signals indicative of a state of the combined model of the first physical test environment and the virtual test environment;
communicate the set of sensor signals to a robot under control or a virtual robot under control;
control the robot under control or the virtual robot under control based on the set of sensor signals; and
communicate image signals indicative of a state of at least one of the virtual robot under control, the virtual human, the virtual, stationary object, and the virtual, mobile object to the one or more image projection devices, wherein the one or more image projection devices project an image indicative of the state of the at least one of the virtual robot under control, the virtual human, the virtual, stationary object, and the virtual, mobile object onto the first physical test environment, and wherein the one or more signals from the one or more sensors located in the first physical test environment are indicative of the image indicative of the state of the at least one of the virtual robot under control, the virtual human, the virtual, stationary object, and the virtual, mobile object projected onto the first physical test environment.

* * * * *